Nov. 16, 1965   W. W. HAGNER   3,217,649
FUEL PRESSURIZATION SYSTEM
Filed Feb. 26, 1963                2 Sheets-Sheet 1
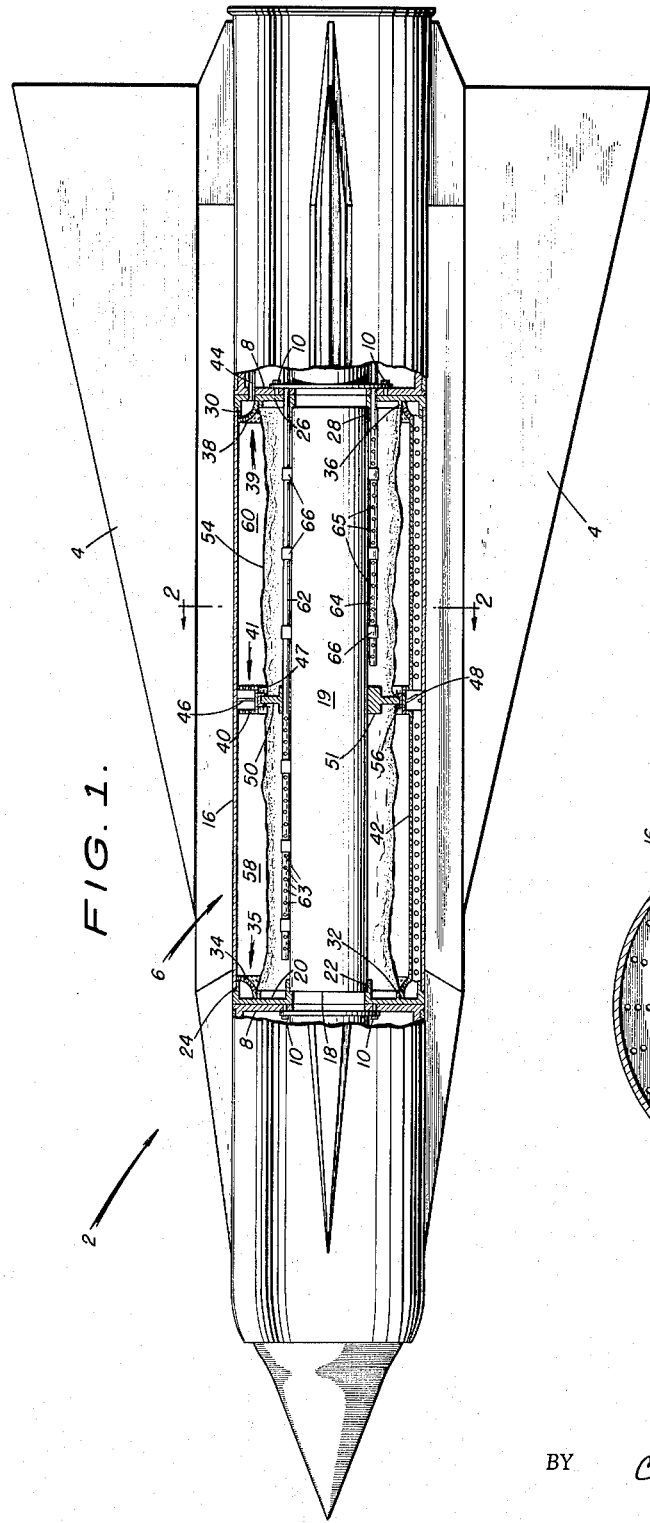
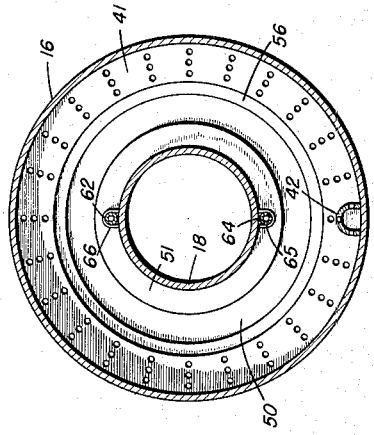
WALTER W. HAGNER
INVENTOR
BY Claude Funkhouser
ATTORNEY Nov. 16, 1965    W. W. HAGNER    3,217,649
FUEL PRESSURIZATION SYSTEM
Filed Feb. 26, 1963    2 Sheets-Sheet 2
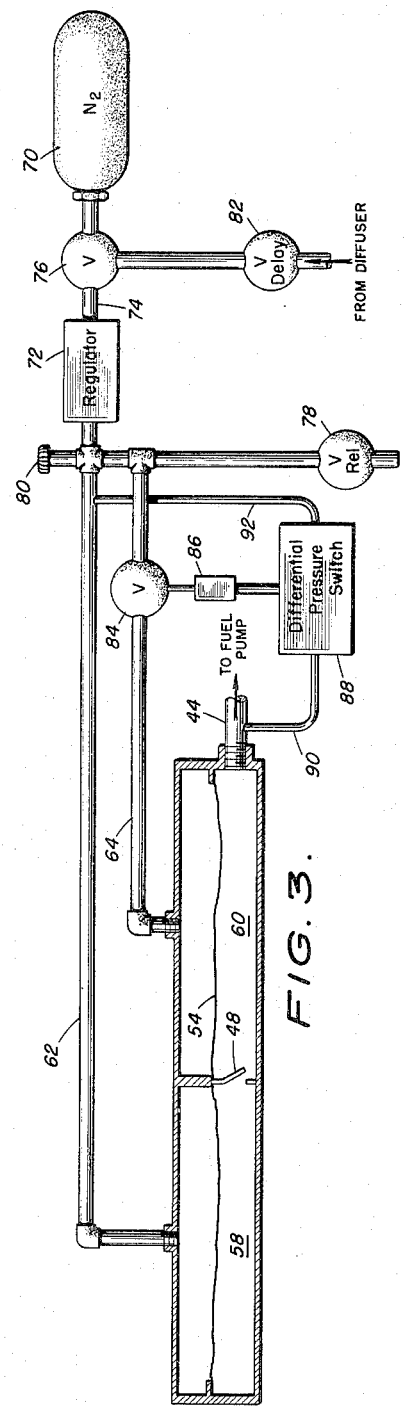
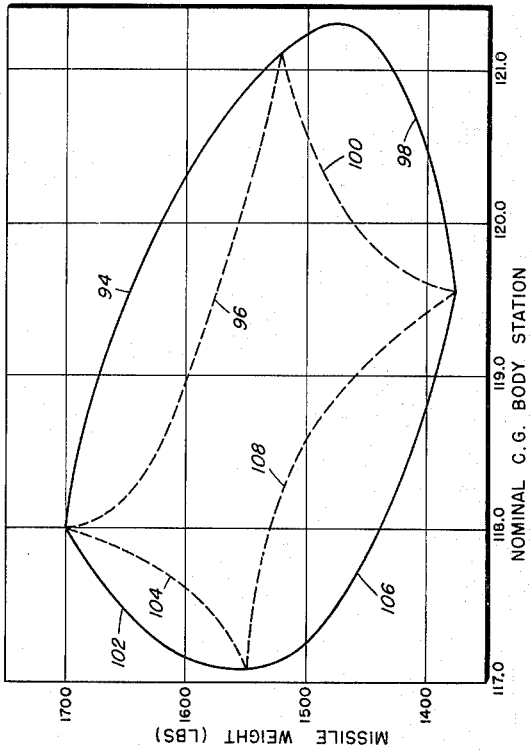
WALTER W. HAGNER
INVENTOR
BY Claude Funkhouser
ATTORNEY

United States Patent Office 3,217,649
Patented Nov. 16, 1965

3,217,649
FUEL PRESSURIZATION SYSTEM
Walter W. Hagner, Rockville, Md., assignor to the United States of America as represented by the Secretary of the Navy
Filed Feb. 26, 1963, Ser. No. 261,580
5 Claims. (Cl. 102—49)

This invention relates generally to fuel pressurization systems and, more particularly, to a fuel pressurization system capable of maintaining a nearly constant center of gravity within the fuel supply system of an aerial missile.

In the design of certain aerial missiles, it is essential that the center of gravity thereof be maintained within certain critical liimts under all conditions encountered during flight. Since the center of gravity of a missile depends upon the centers of gravity of its various components, the design of each component must be such that its center of gravity is maintained within certain prescribed limits. The center of gravity of the fuel supply system is normally unstable because it is constantly shifting during flight due to fuel consumption and varying acceleration and deceleration forces acting thereon.

It has been found that the center of gravity of the fuel supply system for a missile can be maintained within acceptable limits by providing two tandem fuel tanks arranged to be sequentially emptied, starting with the forward tank. In the present invention, this is accomplished by connecting each tank to a common source of pressurized gas, the connection to the forward tank being unrestricted and the connection to the aft tank having therein an actuator controlled normally closed check valve. The two tanks are connected by one-way check valves, and fuel is forced from the forward tank through the aft tank until the forward tank is empty, at which time the actuator operates at a pressure differential to allow gas pressure to expel the fuel from the rear tank and the one-way check valves between the tanks close to prevent fuel from flowing back into the forward tank.

One object of the present invention, therefore, resides in the provision of a fuel pressurization system for use in an aerial missile for maintaining the missile's center of gravity between prescribed limits.

Another object of the invention is to provide a reliable fuel pressurization system for emptying forward and aft fuel tanks in proper sequence.

A still further object of the invention is to provide a fuel pressurization system that maintains a minimum fuel pressure for a missile's rocket motor by controlling the expulsion of the fuel by sensing a change in pressure of the fuel being expelled.

Other objects and many of the attendant advantages of the present invention will be readily appreciated as the same becomes better understood by reference to the following detailed description when considered in connection with the accompanying drawings, wherein:

FIG. 1 is a side elevation of a missile showing, partially in section, the fuel tank arrangement of the present invention;

FIG. 2 is an enlarged section, on line 2—2 of FIG. 1, omitting the missile wings and the bladder for purposes of clarity;

FIG. 3 is a schematic representation of the fuel pressurization system of the present invention; and FIG. 4 is a graph showing the movement of the center of gravity of a missile equipped with the present invention, as the fuel of said missile is consumed.

Briefly, the invention comprises two fuel tanks arranged forward and aft in a missile, both tanks having expandable bladders therein which, when expanded by a pressurized gas, force fuel from the tanks. Admission of gas to the aft tank is controlled by an actuator operated normally closed check valve which acts to prohibit fuel withdrawal from said tank until the forward tank is empty and the pressure in the outlet fuel line begins to fall. Consequently, in addition to maintaining a nearly constant center of gravity within the fuel tanks, the invention also sustains the fuel pressure level above that value required for rocket engine combustion.

As seen in FIGS. 1 and 2, a missile 2 having wings 4 has mounted in the central portion thereof an annular fuel tank 6. Said tank 6 is attached to a pair of body struts 8 by a plurality of bolts 10. The tank comprises an outer cylinder 16 and an inner cylinder 18, said outer cylinder forming a continuation of the outer casing of the missile body, and the inner cylinder forming part of a diffuser 19. An annular forward end plate 20 is welded or otherwise suitably secured to the forward ends of the inner and outer cylinders 18 and 16, said plate having thereon an axially directed inner annular flange 22 of a size to receive the forward end of the cylinder 18 and an outer annular flange 24 of a size to receive the forward end of the cylinder 16. An annular aft end plate 26 is secured to the aft ends of the inner and outer cylinders 18 and 16, said plate 26 having thereon an axially directed inner annular flange 28 of a size to receive the aft end of the cylinder 18 and an outer axially directed annular flange 30 of a size to receive the aft end of the cylinder 16.

Secured to the flange 24 on the end plate 20, and to an additional inwardly directed flange 32, formed on said plate between the flanges 22 and 24, is an annular, arcuately shaped in cross-section, perforated metal strip 34, which strip forms, in conjunction with a portion of the end plate 20 and the flange 24, a forward collector tube 35. Welded to the flange 30 on the end plate 26, and to an additional inwardly directed annular flange 36 positioned thereon between the flanges 28 and 30, is an annular, arcuate in cross-section, perforated metal strip 38, which strip forms, in conjunction with a portion of the end plate 26 and the flange 30, an aft collector tube 39. Suitably secured to the outer cylinder 16, midway between the end plates 20 and 26, is an annular, rectangular in cross-section, perforated metal strip 40, which strip forms in conjunction with a portion of the outer cylinder 16 a central collector tube 41. Connecting the annular collector tubes 35, 39 and 41 is a perforated collector tube 42 which extends throughout the length of the tank 6 on the inside wall thereof, and which may be welded to each said annular tube. Positioned through an aperture in the plate 26, and opening within the aft collector tube 39, is a fuel outlet line 44 that leads to a fuel pump (not shown). An annular support 46 is centrally positioned within the tube 40, which support extends from the wall of the cylinder 16 to the annular wall 47 of the tube 41, said support containing therein a plurality of circumferentially spaced check valves, shown schematically at 48, which valves allow fuel to flow through the tube 42 from the forward end of the tank 6 to the aft end thereof, but not in the opposite direction.

An annular stiffener ring 50 is fixed on the inner cylinder 18, which ring has an integral base 51 and is positioned on said cylinder 18 opposite the central collector tube 41 and spaced a slight distance from said tube. An expandable cylindrical bladder 54 is sealed to the flange 32, located on the forward wall 20, and to the flange 36, located on the aft wall 26, and said bladder 54 is loosely disposed within said tank 6 and is clamped to the stiffener ring 50 by an annular clamp ring 56, which clamp ring additionally provides a seal between the ring 50 and the tube 40. The forward compartments thus formed are hereinafter referred to as the forward tank 58, and the aft compartments are referred to as the aft tank 60. The collector tubes 35, 39, 41 and 42 prevent fuel pockets from forming between said bladder 54 and said outer cylinder 16 during the period when the fuel is forced from the tanks 58 and 60.

Extending through a suitably sealed port in the aft end plate 26 and the flange 28 is a conduit 62, which conduit rests against the inner cylinder 18 and extends through the aft tank 60 and the base 51 of the stiffener ring 50, and into the forward tank 58. Said conduit has a plurality of ports 63 opening within the forward tank 58 for venting pressurized gas between said cylinder 18 and that portion of the bladder 54 within said tank 58.

A second conduit 64 passes through another suitably sealed port in the aft end plate 26 and the flange 28, and rests against a portion of the inner cylinder 18 contained within the aft tank 60, said conduit having a plurality of ports 65 for venting gas between the cylinder 18 and that portion of the bladder 54 contained within the aft tank 60. The conduits 62 and 64 are secured to the cylinder 18 by a plurality of clamps 66.

Referring to FIG. 3, there can be seen the source of pressurized nitrogen gas 70 used in the instant invention to expel the fuel from the missile tanks. The nitrogen supply 70 is connected to a pressure regulator 72 by a line 74 having a shut-off valve 76 therein. Connecting the forward tank 58 with the pressure regulator 72 is the pressure conduit 62, which conduit is connected to the aft tank 60 by the other pressure conduit 64. The conduits 62 and 64 are connected to a pressure relief valve 78 and a bladder vent 80, as is the usual practice. Connected to the shut-off valve 76 is a delay valve 82 which controls the opening of the valve 76, in a manner well-known in the art, until there is sufficient pressure in the diffuser 19 to prevent collapse of the inner cylinder 18, as seen in FIG. 1, upon admission of pressurized nitrogen thereto.

A normally closed check valve 84 is provided in the conduit 64 to control the admission of nitrogen to the aft tank 60. An actuator 86 which operates the valve 84 is connected to said valve 84 and to a normally closed differential pressure switch 88, said switch having a pair of pressure taps 90 and 92 for sensing the fuel pressure in the fuel line 44 and the nitrogen pressure in the conduit 62 respectively. The switch 88 opens when the nitrogen pressure in the conduit 62 exceeds the fuel pressure in the line 44 by a predetermined amount.

The operation of the system as described with reference to FIGS. 1, 2 and 3, is as follows. The launching of the missile by a booster rocket will cause the fuel pressure in the system to be increased due to acceleration forces acting thereon. As the speed of the missile increases, pressure in the diffuser 19 increases until it is sufficient to open the delay valve 82, which causes the shut-off valve 76 to open. Pressurized nitrogen then flows through the regulator 72 to the forward tank 58 and the valve 84. The normally closed check valve 84 is constructed, in a manner well-known in the art, so that it will open under the initial pressure of the nitrogen from the regulator 72. After the valve 84 opens, pressurized nitrogen flows to the aft tank 60 and also through said valve 84 into the actuator 86. Once nitrogen enters the actuator 86 the nitrogen pressure on the supply side of the valve 84 is equalized by the nitrogen pressure in the actuator 86 and valve 84 again closes. Fuel is not withdrawn from the fuel tanks at this point since the ramjet motor of the missile is not actuated until after the booster rocket ceases to operate and separates from the missile. Since there is no fuel withdrawal from line 44 and the fuel is undergoing a pressure increase due to the acceleration forces acting thereon, there is not a large enough pressure differential between fuel line 44 and conduit 62 to open the differential pressure switch 88.

At a predetermined time after separation the missile ramjet motor ignites and fuel is delivered to the fuel pump, the fuel being forced from the tank 58 through the check valves 48 and the tank 60. As the volume of fuel in the tank 58 approaches empty and the acceleration forces acting thereon disappear, the fuel pressure in the line 44 begins to decrease until it reaches a predetermined amount less than the nitrogen pressure. This pressure differential is attained when the fuel pressure has decreased to a level just sufficient to support combustion in the ramjet motor of the missile. Due to the decreasing fuel pressure in line 44 the differential pressure switch 88 senses the pressure differential between the line 44 and the conduit 62 and opens, thereby allowing the equalizing pressure in the actuator 86 to pass therethrough. As the equalizing pressure is removed from the actuator 86 the normally closed check valve 84 reopens under the urging of the pressurized nitrogen and admits said pressurized nitrogen to the aft tank 60. The fuel in the tank 60 is withdrawn for the duration of the operation of the ramjet motor.

The operation of the differential switch 88 can best be understood with reference to FIG. 3 wherein all pressures in the conduits 62 and 64 and lines 74, 90 and 92, are at atmospheric level prior to launch. Upon release of pressurized gas through the regulator 72 into the conduits 62 and 64, the pressure increases on the bladder 54 in forward tanks 58 and on the normally closed check valve 84. The valve 84 opens due to this pressure increase and allows the bladder 54 in aft tank 60 to be placed under pressure. As the valve 84 opens, pressure passes into the actuator 86 through the opened valve 84 for equalizing the pressure differential between the supply side of the valve 84 and the actuator 86, thereby closing said valve. As pressure on the bladder 54 in the forward tank 58 increases, the fuel pressure in line 44 also increases, due to the pressure on the bladder and the acceleration forces acting on the fuel. Therefore, there is not a large enough pressure difference between the fuel line 44 and the conduit 62 and the differential pressure switch 88 remains closed. When the forward tank 58 is substantially emptied of its fuel and the accelerating forces acting thereon have disappeared, the fuel pressure decreases in line 44 thereby causing the differential pressure switch to open. After the opening of the pressure switch 85, due to the absence of acceleration forces acting on the fuel, the fuel pressure in line 44 never becomes enough greater than the pressure in conduit 62 to close the pressure switch 88. As said differential pressure switch 88 opens, the fluid under pressure in the actuator 86, which had equalized the pressure on the normally closed check valve 84, passes through the opened pressure switch 88 and into the line 44. Once the equalizing pressure is removed from the actuator 86 the normally closed check valve 84 opens under the urging of the pressure in conduit 64. Pressure is then applied to the bladder 54 in aft tank 60. The fluid under pressure, which before had passed through the valve 84 to the actuator 86, continues through the opened differential pressure switch 88 and into fuel line 44. In this manner the pressure differential across valve 84 is never equalized and said valve remains open for the duration of the ramjet motor's operation, thereby allowing continuous sequential drainage of fuel from the aft tank 60.

The center of gravity of a missile fully fueled and armed, as indicated in FIG. 4, varies only a maximum of 3.3 inches when its fuel system operates according to the instant invention.

The area between the portions of the curves 94 and 96 in FIG. 4 relate to the possible locations of the center of gravity under various acceleration forces as the forward tank 58 is emptied, and the area between the portions of the curves 98 and 100 relate to the various possibilities of the center of gravity depending on different forces acting on the missile during flight, as the aft tank is emptied.

The center of gravity of the missile can be maintained within acceptable limits by reversing the sequence of emptying the tanks. By emptying the aft tank first, the missile's center of gravity is within the area of the graph between the lines 102 and 104, and between the lines 106 and 108 while the forward tank is emptying.

Obviously, many modifications and variations of the present invention are possible in the light of the above teachings. It is therefore to be understood that within the scope of the appended claims the invention may be practiced otherwise than as specifically described.

What is claimed is:

1. A fuel pressurization system for an aerial vehicle, comprising,
   a pair of fuel tanks coaxially arranged to form a forward and an aft tank, each of said tanks having an outlet means and inner and outer cylinders,
   bladder means in each of said tanks,
   a source of pressurized gas,
   a pair of conduits each connecting said pressure source with one of said tanks to permit pressurized gas to compress said bladder means for forcing fuel from said tanks,
   one of said conduits being unrestricted,
   a normally closed check valve in the remaining conduit to regulate the flow of gas therein,
   an actuator connected to said check valve, and
   a pressure differential switch connected to said actuator for operating said actuator,
   said switch being connected to one of said fuel outlet means and connected to said pressure source,
   said switch sensing a predetermined pressure differential between said pressure in said fuel outlet means and said pressure source and triggering said actuator for opening said check valve, whereby said tanks will be exhausted individually in a predetermined sequence.

2. A fuel pressurization system as recited in claim 1, wherein said outlet means comprises,
   a plurality of check valves annularly arranged between forward and aft tanks, and
   a fuel line connected to the aft tank,
   said check valves passing fuel from the forward tank into said aft tank under urging from said flexible bladder means upon compression thereof.

3. A fuel pressurization system for an aerial vehicle, comprising,
   a pair of fuel tanks coaxially arranged to form a forward and an aft tank, each of said tanks having an outlet means and inner and outer cylinders,
   flexible bladder means in each of said tanks,
   a source of pressurized gas,
   a pair of conduits each connecting said pressure source with one of said tanks to permit pressurized gas to compress said bladder means for forcing fuel from said tanks,
   collector means mounted within each tank for preventing fuel pockets from forming while the fuel is being forced from said tanks,
   one of said conduits being unrestricted,
   a normally closed check valve in the remaining conduit to regulate the flow of gas therein,
   an actuator connected to said check valve, and
   a pressure differential switch connected to said actuator for operating said actuator,
   said switch being connected to one of said fuel outlet means and connected to said pressure source,
   said switch sensing a predetermined pressure differential between said pressure in said fuel outlet means and said pressure source and triggering said actuator for opening said check valve, whereby said tanks will be exhausted individually in a predetermined sequence.

4. A fuel pressurization system as recited in claim 3, wherein said collector means comprises,
   a forward collector tube annularly disposed within said forward tank,
   an annular central collector tube attached to said outer cylinder between said tanks,
   an aft collector tube annularly disposed within said aft tank, and
   a longitudinal collector tube for interconnecting all beforementioned collector tubes.

5. A fuel pressurization system as recited in claim 3, wherein said outlet means comprises,
   a plurality of check valves annularly arranged between forward and aft tanks, and
   a fuel line connected to said aft tank and opening within said aft collector tube disposed within said tank,
   said check valves passing fuel from the forward tank into said aft tank under urging from said flexible bladder means upon compression thereof.

References Cited by the Examiner

UNITED STATES PATENTS

| | | | |
|---|---|---|---|
| 2,648,196 | 8/1953 | Mullen II et al. | |
| 2,892,410 | 6/1959 | Sloan | 102—49 |
| 2,979,897 | 4/1961 | Studhalter et al. | 60—39.48 |
| 3,043,221 | 7/1962 | Swanser | 102—49 |
| 3,154,093 | 10/1964 | Blackburn et al. | 137—255 |

BENJAMIN A. BORCHELT, *Primary Examiner.*

SAMUEL FEINBERG, *Examiner.*